United States Patent
Chang et al.

(10) Patent No.: US 10,120,272 B1
(45) Date of Patent: Nov. 6, 2018

(54) FLUORESCENT COLOR WHEEL AND PROJECTOR

(71) Applicant: DELTA ELECTRONICS, INC., Taoyuan (TW)

(72) Inventors: Keh-Su Chang, Taoyuan (TW); Yen-I Chou, Taoyuan (TW); Chi Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 15/693,497

(22) Filed: Sep. 1, 2017

(30) Foreign Application Priority Data

May 3, 2017 (TW) .............................. 106114570 A

(51) Int. Cl.
*G03B 21/20* (2006.01)
*G03B 33/08* (2006.01)
*G03B 21/28* (2006.01)
*G03B 21/16* (2006.01)

(52) U.S. Cl.
CPC ........... *G03B 21/204* (2013.01); *G03B 21/16* (2013.01); *G03B 21/28* (2013.01); *G03B 33/08* (2013.01)

(58) Field of Classification Search
CPC ...... G03B 21/14; G03B 21/16; G03B 21/145; G03B 21/204; H01L 33/20; H01L 33/44; H01L 33/502
See application file for complete search history.

(56) References Cited

U.S. PATENT DOCUMENTS

| 9,442,351 B2 | 9/2016 | Lin et al. | |
|---|---|---|---|
| 2007/0048186 A1* | 3/2007 | Call | B07B 7/00 422/68.1 |
| 2011/0304830 A1 | 12/2011 | Kato et al. | |
| 2011/0317396 A1* | 12/2011 | Emtman | G01J 3/10 362/84 |
| 2012/0106126 A1* | 5/2012 | Nojima | G02B 26/008 362/84 |
| 2013/0257264 A1* | 10/2013 | Tamaki | B05D 5/06 313/503 |
| 2016/0348857 A1* | 12/2016 | Miyata | F21S 41/16 |

FOREIGN PATENT DOCUMENTS

| CN | 103703414 A | 4/2014 |
|---|---|---|
| CN | 105867059 A | 8/2016 |
| TW | 201421745 A | 6/2014 |
| TW | 201621453 A | 6/2016 |

* cited by examiner

*Primary Examiner* — Sultan Chowdhury
(74) *Attorney, Agent, or Firm* — CKC & Partners Co., Ltd.

(57) ABSTRACT

A fluorescent color wheel includes a substrate, a working fluid, and a fluorescent powder layer. The substrate has at least one flow channel therein. The flow channel has a first end and a second end respectively adjacent to a central region and a peripheral region of the substrate. The working fluid flows in the flow channel in a gas-liquid coexistence state. The fluorescent powder layer is disposed on the substrate and located at the peripheral region. The disclosure further discloses a projector adopting the fluorescent color wheel.

10 Claims, 7 Drawing Sheets

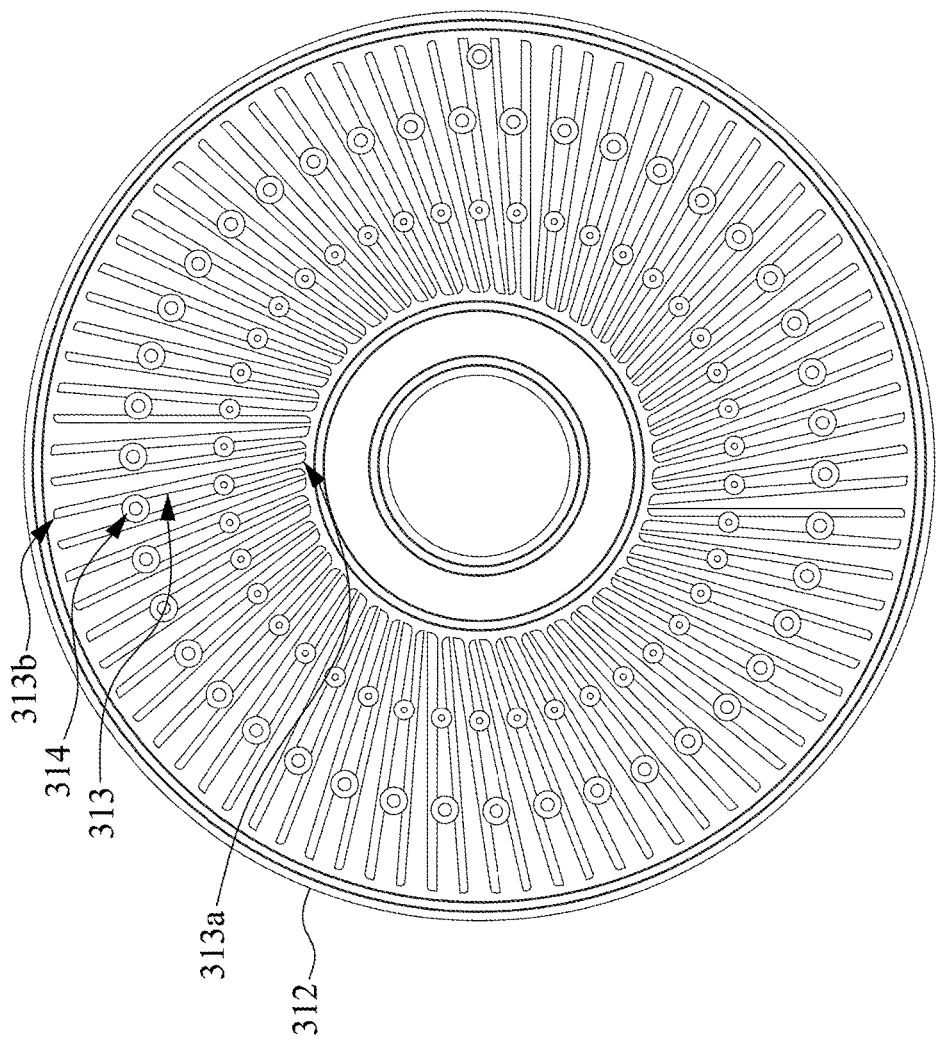

FLUORESCENT COLOR WHEEL AND PROJECTOR

RELATED APPLICATIONS

This application claims priority to Taiwan Application Serial Number 106114570, filed May 3, 2017, which is herein incorporated by reference.

BACKGROUND

Technical Field

The present disclosure relates to a fluorescent color wheel, and more particularly, to a projector using the fluorescent color wheel.

Description of Related Art

In recent years, the light source module using solid-state laser to excite the fluorescent color wheel has become a new light source technology of projectors. Practically, the fluorescent color wheel is irradiated by blue light laser having output power of tens to hundreds of watts, and the energy density per unit area (square centimeters) of the laser spot is as high as tens of watts or more. Hence, how to manage the thermal energy on the fluorescent color wheel will be a key factor in the performance of each kind of laser-fluorescent color wheel light source module.

In a conventional fluorescent color wheel, the fluorescent band is coated on the disc substrate. By using the motor to rotate the disc substrate to make the laser spot uniformly irradiate and move on the whole fluorescent band, the average energy excited by the laser at a single point on the fluorescent band can be reduced. For a reflective fluorescent color wheel, the material of the disc substrate can include aluminum to help dissipate heat; for a transmissive fluorescent color wheel, the disc substrate can only be a transparent substrate can include low thermal conductivity materials such as glass, quartz, sapphire, and etc.

However, for a large venue projector, the demand of higher laser energy is often only can be met by increase the size of the disc substrate of the fluorescent color wheel, which is often limited by the load capacity of the motor, and the excessively large moment of inertia results in instability of light output of the fluorescent color wheel.

SUMMARY

An aspect of the disclosure is to provide a fluorescent color wheel that can effectively improve the cooling efficiency and illumination performance and a projector using the fluorescent color wheel.

According to an embodiment of the disclosure, a fluorescent color wheel includes a substrate, a working fluid, and a fluorescent powder layer. The substrate has at least one flow channel therein. The flow channel has a first end and a second end respectively adjacent to a central region and a peripheral region of the substrate. The working fluid flows in the flow channel in a gas-liquid coexistence state. The fluorescent powder layer is disposed on the substrate and located at the peripheral region.

In an embodiment of the disclosure, the substrate has a centroid located in the central region. A virtual extension line of the flow channel does not intersect the centroid.

In an embodiment of the disclosure, the substrate is configured to rotate along a rotational direction based on the centroid. The virtual extension line is offset relative to a radial extension line passing through the centroid and the first end based on the first end along an opposite direction of the rotational direction.

According to another embodiment of the disclosure, a projector includes a housing, a motor, and a fluorescent color wheel. The motor is disposed in the housing and has a shaft. The fluorescent color wheel includes a substrate, a working fluid, and a fluorescent powder layer. The substrate has at least one flow channel therein. The flow channel has a first end and a second end respectively adjacent to a central region and a peripheral region of the substrate. The substrate has a hole located at the central region and engaged with the shaft. The working fluid flows in the flow channel in a gas-liquid coexistence state. The fluorescent powder layer is disposed on the substrate and located at the peripheral region.

In an embodiment of the disclosure, the substrate further has a plurality of the flow channels. The flow channels are radially arranged around the central region.

In an embodiment of the disclosure, the substrate further has at least one passageway communicated between adjacent two of the flow channels.

In an embodiment of the disclosure, the passageway is located between the first end and the second end of any of the adjacent two of the flow channels.

In an embodiment of the disclosure, the shaft has a central axis. A virtual extension line of the flow channel does not intersect the central axis.

In an embodiment of the disclosure, the motor is configured to make the substrate rotate along a rotational direction through the shaft. The virtual extension line is offset relative to a radial extension line passing through the central axis and the first end based on the first end along an opposite direction of the rotational direction.

In an embodiment of the disclosure, the virtual extension line is offset relative to the radial extension line along the opposite direction with an angle. The angle is greater than 0 degree and smaller than 90 degrees.

Accordingly, in the fluorescent color wheel and the projector using the fluorescent color wheel of the disclosure, the substrate has the flow channel in which the working fluid flows in a gas-liquid coexistence state, and two ends of the flow channel respectively extend toward the central region and the peripheral region of the substrate. Hence, when the light source projects a light spot onto the fluorescent powder layer disposed at the peripheral region, not only can convection caused by high-speed rotation dissipate the produced heat, but the liquid working fluid can rapidly move to the end of the flow channel adjacent to the peripheral region of the substrate by the centrifugal force generated when the substrate is rotated, so as to absorb the heat. When the liquid working fluid absorbing the heat is transformed to the gaseous working fluid, the high temperature gas will automatically move to the end of the flow channel adjacent to the central region of the substrate due to the pressure in the flow channel and then cool down and return to low-temperature liquid. Therefore, the design using principles of phase change and centrifugal force can rapidly uniform the temperatures of the central region and the peripheral region of the substrate, so as to significantly improve the disadvantage that the heat is accumulated at the peripheral region of the fluorescent color wheel.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 7 is a top view of the lower cover according to another embodiment of the disclosure.

DETAILED DESCRIPTION

Figure 1:
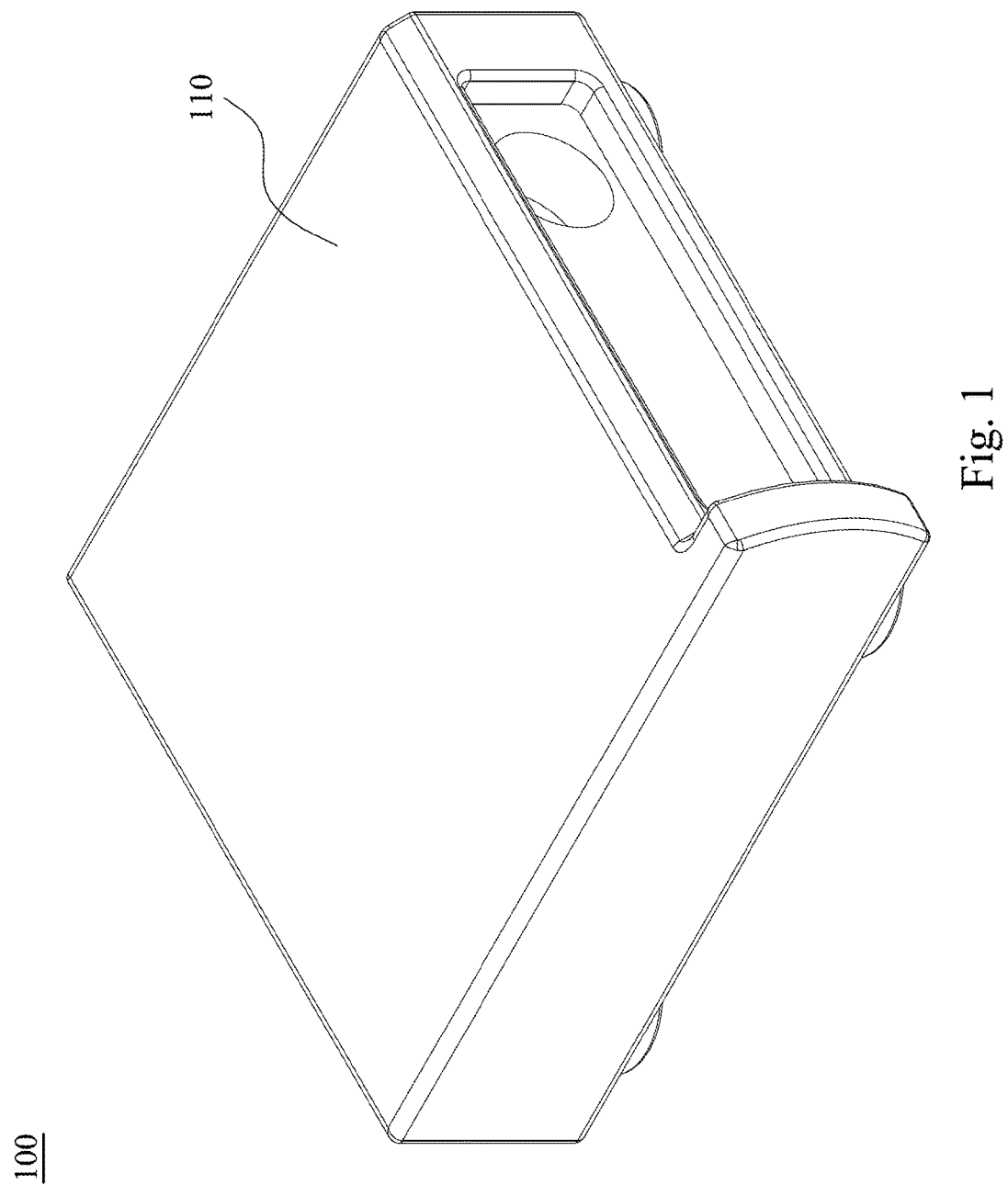
FIG. 1 is a perspective view of a projector according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

Figure 2:
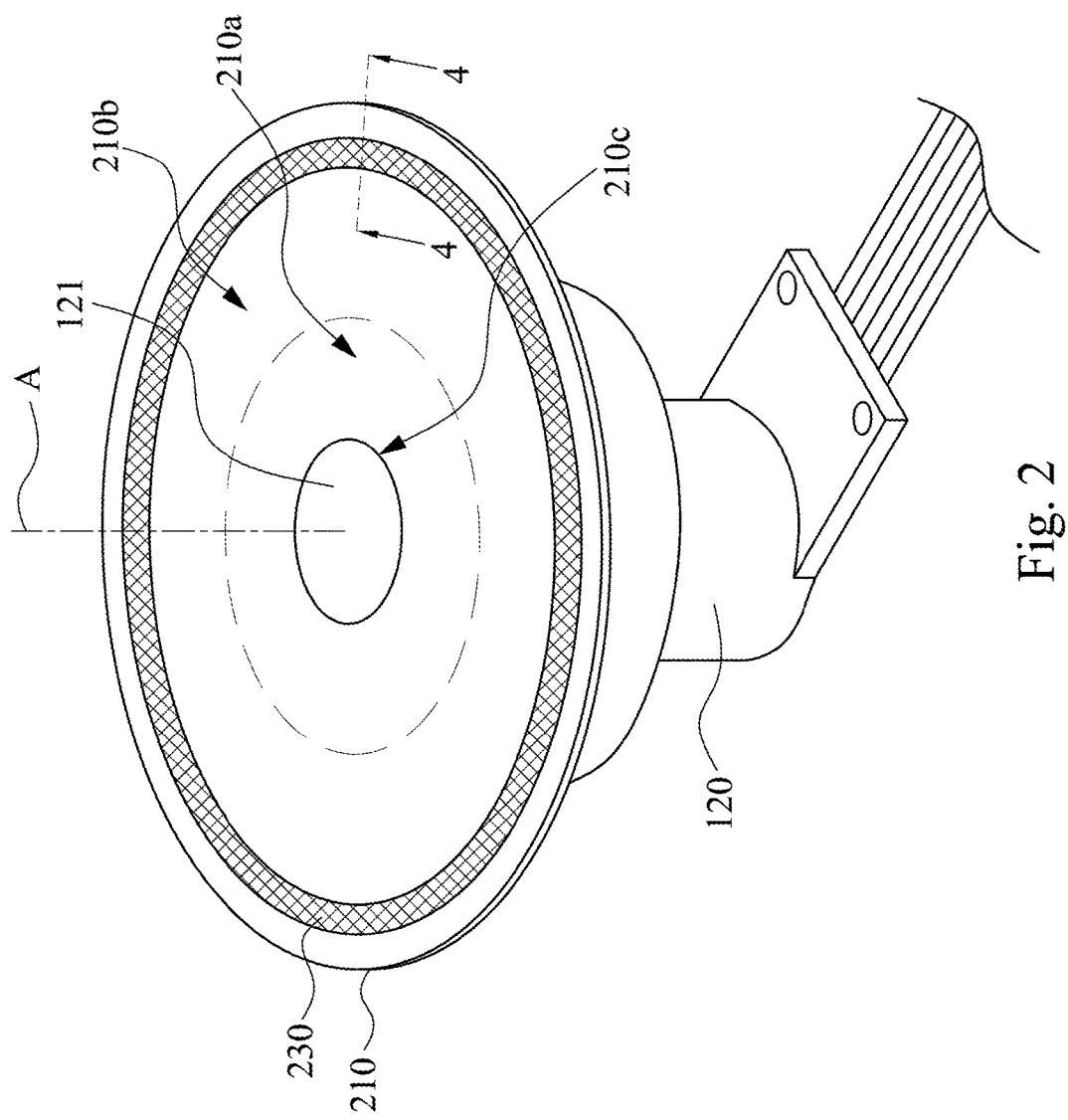
FIG. 2 is a perspective view of some components disposed in a housing of the projector according to an embodiment of the disclosure.

Reference is made to FIGS. 1 and 2. FIG. 1 is a perspective view of a projector 100 according to an embodiment of the disclosure. FIG. 2 is a perspective view of some components disposed in a housing 110 of the projector 100 according to an embodiment of the disclosure. As shown in FIGS. 1 and 2, in the embodiment, the projector 100 includes the housing 110, a motor 120, a fluorescent color wheel 200, and a light source (not shown). The motor 120 is disposed in the housing 110 and has a shaft 121. The fluorescent color wheel 200 includes a substrate 210 and a fluorescent powder layer 230. The substrate 210 includes a central region 210a and a peripheral region 210b, and the peripheral region 210b is connected at an outer edge of the central region 210a. The substrate 210 has a hole 210c located at the central region 210a. The hole 210c is engaged with the shaft 121 of the motor 120. The fluorescent powder layer 230 is disposed on the substrate 210 and located at the peripheral region 210b of the substrate 210. A contour of the fluorescent powder layer 230 is circular, but the disclosure is not limited in this regard. In practical applications, the contour of the fluorescent powder layer 230 can be arc-shaped. The light source is disposed in the housing 110 and configured to emit light to the fluorescent powder layer 230, so as to generate a light spot on the fluorescent powder layer 230. The motor 120 is configured to rotate the shaft 121, so as to make the whole fluorescent color wheel 200 rotate around a central axis A of the shaft 121. Hence, the light spot generated by the light source can move along a circle on the fluorescent powder layer 230.

In some embodiments, the light source is a laser light source, but the disclosure is not limited in this regard.

Figure 3:
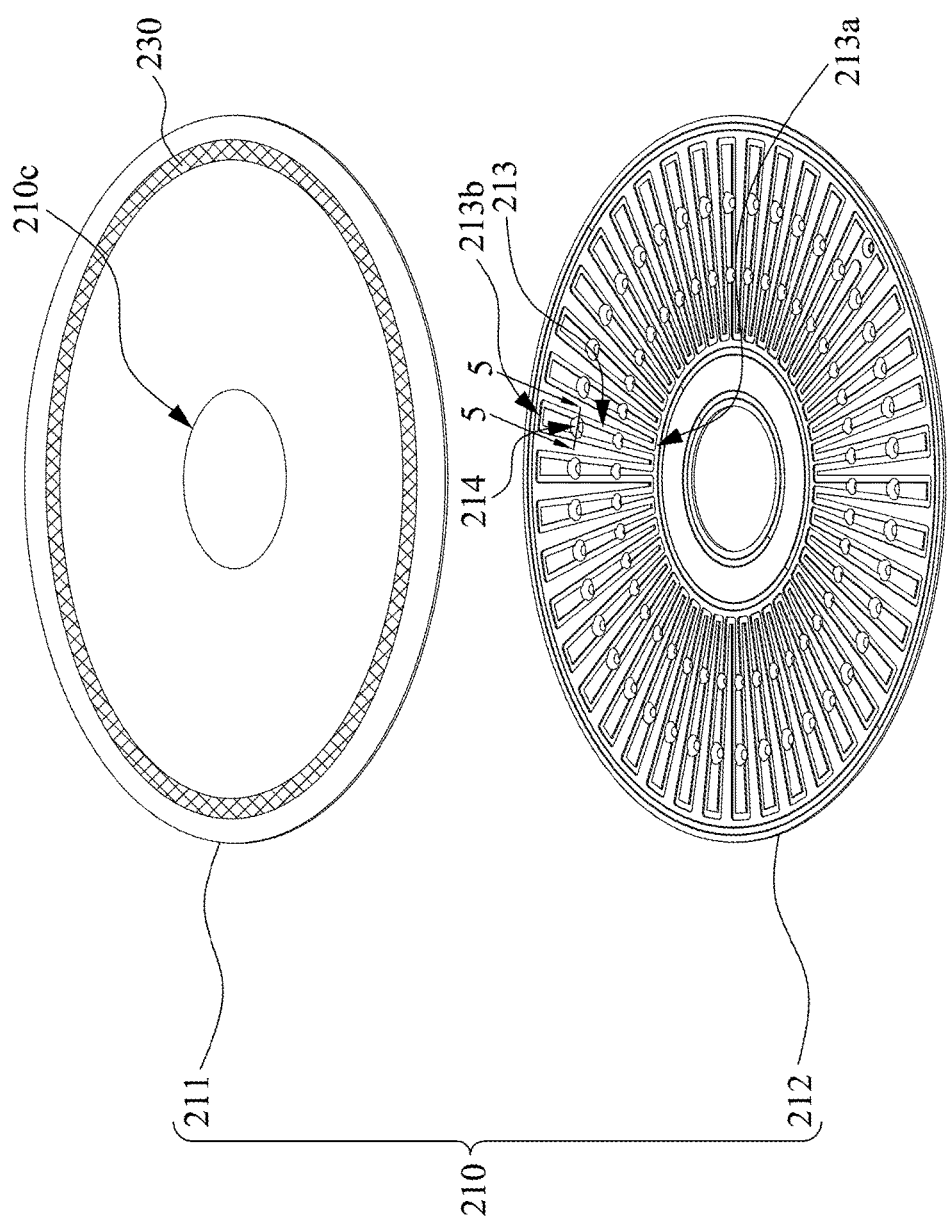
FIG. 3 is a perspective view of a fluorescent color wheel in FIG. 2, in which an upper cover and a lower cover of a substrate are separated.
Figure 4:
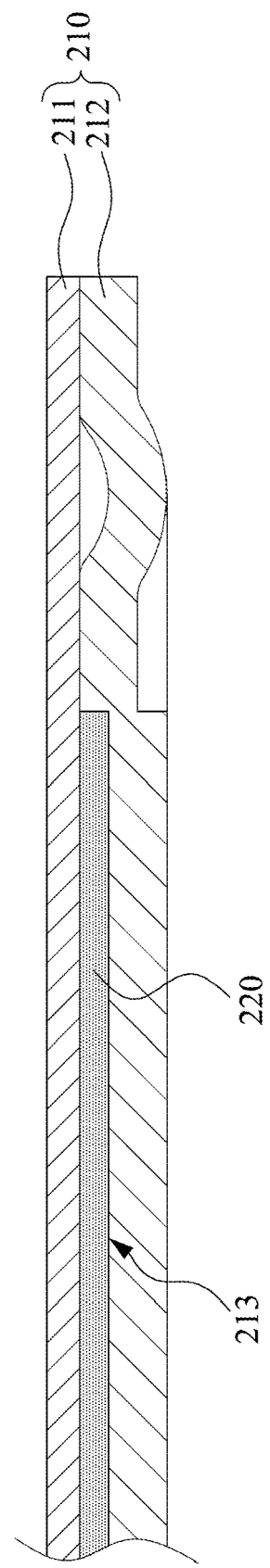
FIG. 4 is a cross-sectional view of the fluorescent color wheel taken along line 4-4 in FIG. 2.

Reference is made to FIGS. 3 and 4. FIG. 3 is a perspective view of the fluorescent color wheel 200 in FIG. 2, in which an upper cover 211 and a lower cover 212 of the substrate 210 are separated. FIG. 4 is a cross-sectional view of the fluorescent color wheel 200 taken along line 4-4 in FIG. 2. As shown in FIGS. 3 and 4, in the embodiment, the substrate 210 of the fluorescent color wheel 200 is a closed container constituted by the upper cover 211 and the lower cover 212. The upper cover 211 is a flat plate, and a surface of the lower cover 212 facing the upper cover 211 has a plurality of recesses. These recesses form a plurality of flow channels 213 between the upper cover 211 and the lower cover 212. These flow channels 213 are radially arranged around the central region 210a. Specifically, each of the flow channels 213 has a first end 213a and a second end 213b respectively adjacent to the central region 210a and the peripheral region 210b of the substrate 210. In other words, each of the flow channels 213 is extended toward the central region 210a and a peripheral region 210b of the substrate 210.

The fluorescent color wheel 200 further includes a working fluid 220. The working fluid 220 flows in the flow channels 213 in a gas-liquid coexistence state. Hence, when the light source projects the light spot onto the fluorescent powder layer 230 disposed at the peripheral region 210b of the substrate 210, not only can convection caused by high-speed rotation dissipate the produced heat, but the liquid the working fluid 220 can rapidly move to the second ends 213b of the flow channels 213 adjacent to the peripheral region 210b of the substrate 210 by the centrifugal force generated when the substrate 210 is rotated, so as to absorb the heat. When the liquid working fluid 220 absorbing the heat is transformed to the gaseous working fluid 220, the high-temperature gas will automatically move to the first ends 213a of the flow channels 213 adjacent to the central region 210a of the substrate 210 due to the pressure in the flow channels 213 and then cool down and return to low-temperature liquid. Afterwards, the low-temperature liquid working fluid 220 will return back to the heat-absorbing end (i.e., the second end 213b) to recycle again, such that the heat can be continuously carried away from the hot object (i.e., the fluorescent powder layer 230) to lower the temperature of the hot object, and thus the effect of making the temperatures of the whole substrate 210 be uniform.

In some embodiments, the flow channels 213 can further be capillary structures formed in the interior of the substrate 210. Hence, the capillary reflux can be smoothly performed regardless of the fluorescent color wheel 200 is placed in what orientation angle.

Figure 5:
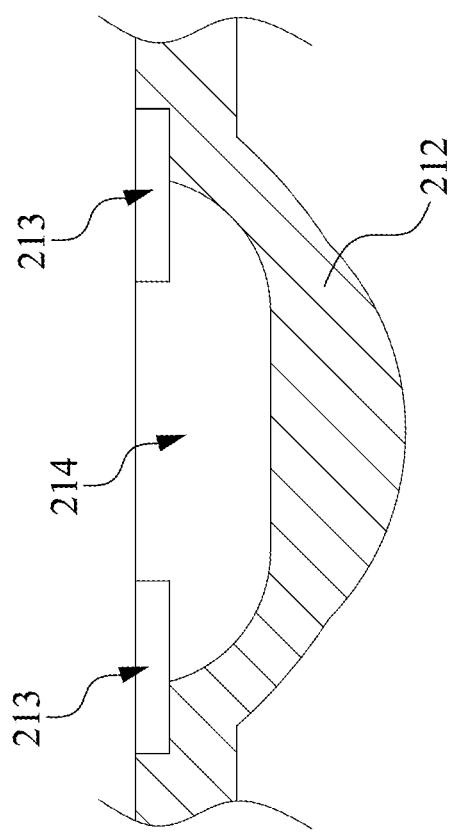
FIG. 5 is a cross-sectional view of the lower cover taken along line 5-5 in FIG. 3.

Reference is made to FIG. 5. FIG. 5 is a cross-sectional view of the lower cover 212 taken along line 5-5 in FIG. 3. As shown in FIGS. 3 and 5, in the embodiment, the substrate 210 further has a plurality of passageways 214 therein. Each of the passageways 214 is communicated between adjacent two of the flow channels 213. Specifically, each of the passageways 214 is located between the first end 213a and the second end 213b of any of the adjacent two of the flow channels 213, and the second ends 213b of the adjacent two of the flow channels 213 are connected to each other. Hence, the low-temperature liquid working fluid 220 that is forced to move to the second ends 213b of the flow channels 213 due to the rotation of the fluorescent color wheel 200 and the high-temperature gaseous working fluid 220 that moves from the second ends 213b to the first ends 213a of the flow channels 213 can dodge each other at least at the passageways 214. Therefore, the passageways 214 can effectively prevent the liquid working fluid 220 and the gaseous working fluid 220 from interfering with each other during flowing, thereby increasing the smoothness of the flow of the working fluid 220 in the flow channels 213.

Figure 6:
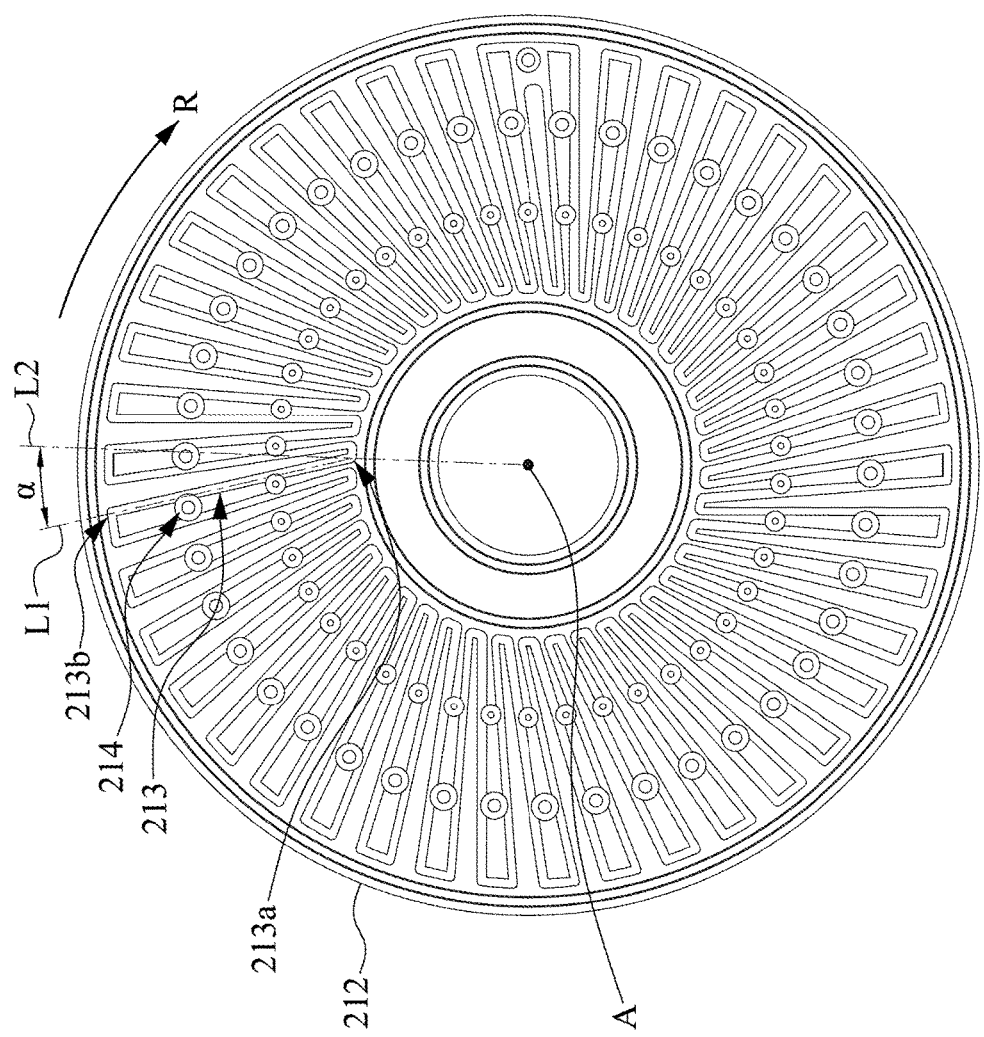
FIG. 6 is a top view of the lower cover according to another embodiment of the disclosure.

Reference is made to FIG. 6. FIG. 6 is a top view of the lower cover 212 according to another embodiment of the disclosure. As shown in FIG. 6, in the embodiment, a virtual extension line L1 (only illustratively drawing and labeling one virtual extension line L1 in FIG. 6) of each of the flow channels 213 does not intersect the central axis A of the shaft 121. On the other hand, the substrate 210 has a centroid coinciding with the central axis A in FIG. 6, so the centroid is not additionally labeled. As a result, the centroid of the substrate 210 is also located in the central region 210a, and virtual extension line L1 of each of the flow channels 213 does not intersect the centroid. Specifically, the motor 120 is configured to make the substrate 210 rotate along a rotational direction R (e.g., the clockwise direction in FIG. 6) through the shaft 121. Taking one of the flow channels 213 for an example, a radial extension line L2 is defined by passing through the central axis A and the first end 213a of said one of the flow channels 213, the virtual extension line L1 is offset relative to the radial extension line L2 based on the first end 213a along an opposite direction of the rotational direction R (i.e., the counterclockwise direction in FIG. 6). The defined radial extension line L2 also passes through the centroid of the substrate 210 and the first end 213a of said one of the flow channels 213. Hence, on the other hand, the substrate 210 is configured to rotate along the rotational direction R based on the centroid, and the virtual extension line L1 is offset relative to the radial extension line L2 based on the first end 213a along the opposite direction of the rotational direction R. It should be pointed out that because the substrate 210 rotates along the rotational direction R, each of the flow channels 213 will apply a force to the working fluid 220 along the rotational direction R. By making the flow channels 213 be offset along the opposite direction of the rotational direction R, the component of the force that each of the flow channels 213 apply to the working fluid 220 along the opposite direction of the rotational direction R can be reduced, and the component of the force that each of the flow channels 213 apply to move the working fluid 220 toward the second end 213b can be increased, so that the working fluid 220 can flow to the second ends 213b of the flow channels 213 more smoothly.

In some embodiments, the virtual extension line L1 is offset relative to the radial extension line L2 along the opposite direction with an angle α. The angle α is greater than 0 degree and smaller than 90 degrees.

As shown in FIG. 6, all of the flow channels 213 are uniformly formed on the lower cover 212 (i.e., all of the flow channels 213 are equidistantly arranged), but the disclosure is not limited in this regard. In practical applications, the flow channels 213 can be distributed on the lower cover 212 in a non-uniform manner. For example, the flow channels 213 are non-equidistantly arranged, so some of the flow channels 213 are arranged more sparsely and of the flow channels 213 are arranged more closely.

Reference is made to FIG. 7. FIG. 7 is a top view of the lower cover 312 according to another embodiment of the disclosure. As shown in FIG. 7, in the embodiment, the substrate 210 of the fluorescent color wheel 200 can also be constituted by the upper cover 211 and the lower cover 312. A surface of the lower cover 312 facing the upper cover 211 has a plurality of recesses. These recesses form a plurality of flow channels 313 between the upper cover 211 and the lower cover 312. These flow channels 313 are radially arranged around the central region 210a (see FIG. 2). Specifically, each of the flow channels 313 has a first end 313a and a second end 313b respectively adjacent to the central region 210a and the peripheral region 210b of the substrate 210 (see FIG. 2). It should be pointed out that the difference between the lower cover 312 of the present embodiment and the lower cover 212 in FIG. 6 is that the flow channels 313 of the present embodiment are independent and discontinuous, but the flow channels 213 in FIG. 6 are sequentially connected end to end (i.e., the first end 213a of each flow channel 213 is connected to the second end 213b of another flow channel 213).

As shown in FIG. 7, all of the flow channels 313 are uniformly formed on the lower cover 312 (i.e., all of the flow channels 313 are equidistantly arranged), but the disclosure is not limited in this regard. In practical applications, the flow channels 313 can be distributed on the lower cover 312 in a non-uniform manner. For example, the flow channels 313 are non-equidistantly arranged, so some of the flow channels 313 are arranged more sparsely and of the flow channels 313 are arranged more closely.

In some embodiments, the upper cover 211 and the lower cover 212 of the substrate 210 is integrally formed to be a one-piece structure.

In some embodiments, the recesses formed on the lower cover 212 can be omitted and formed on the upper cover 211. In some other embodiments, the recesses can be formed on both the upper cover 211 and the lower cover 212, and each of the recesses on the upper cover 211 and a corresponding one of the recesses on the lower cover 212 form one of the flow channels 213.

In some embodiments, an exterior surface of the substrate 210 can be uneven in response to the flow channels 213, so as to increase the heat-dissipating area of the substrate 210.

In some embodiments, the substrate 210 can be a reflective and opaque substrate. The material of the substrate 210 can include a metal material, a ceramic material, or a semiconductor material. The metal material can include aluminum, silver, copper, iron, manganese, etc., or an alloy thereof. The ceramic material can include AlN, BN, SiC, $Al_2O_3$, and etc. The semiconductor material can include a single semiconductor material (e.g., Si, Ge, and etc.), a binary semiconductor material (e.g., GaAs, InP, GaN, InAs, ZnSe, ZnS, InSe, and etc.), or other compound semiconductors.

In some embodiments, the substrate 210 can be a transmissive and translucent substrate. The material of the substrate 210 can include glass, quartz, sapphire, or $CaF_2$.

In some embodiments, in addition to the upper cover 211 and the lower cover 212, the substrate 210 can further include a closed container (not shown) accommodated in the space formed between the upper cover 211 and the lower cover 212, and the flow channels 213 are formed by the closed container. In some embodiments, the closed container can include a material that is resistant to high pressure, corrosion resistant, or has a high thermal conductivity, such as glass, ceramic, metal (aluminum, copper, nickel, stainless steel, iron, titanium), diamonds, carbon nanotubes, graphene, or silicon substrates.

In some embodiments, the working fluid 220 can include a low-temperature liquid gas (e.g., hydrogen, neon, oxygen, ammonia, helium, or nitrogen), high-temperature liquid metal (e.g., lithium, sodium, cesium, potassium, mercury, silver, and the like), water, ammonia, alkanes (e.g., methane), benzene, ketones (e.g., acetone), alcohols (e.g., methanol, ethanol, etc.), etc., and it must have a good and appropriate latent heat of vaporization.

According to the foregoing recitations of the embodiments of the disclosure, it can be seen that in the fluorescent color wheel and the projector using the fluorescent color wheel of the disclosure, the substrate has the flow channel in which the working fluid flows in a gas-liquid coexistence state, and two ends of the flow channel respectively extend toward the central region and the peripheral region of the substrate. Hence, when the light source projects a light spot onto the fluorescent powder layer disposed at the peripheral region, not only can convection caused by high-speed rotation dissipate the produced heat, but the liquid working fluid can rapidly move to the end of the flow channel adjacent to the peripheral region of the substrate by the centrifugal force generated when the substrate is rotated, so as to absorb the heat. When the liquid working fluid absorbing the heat is transformed to the gaseous working fluid, the high temperature gas will automatically move to the end of the flow channel adjacent to the central region of the substrate due to the pressure in the flow channel and then cool down and return to low temperature liquid. Therefore, the design using principles of phase change and centrifugal force can rapidly uniform the temperatures of the central region and the peripheral region of the substrate, so as to significantly improve the disadvantage that the heat is accumulated at the peripheral region of the fluorescent color wheel.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A fluorescent color wheel, comprising:
    a substrate having at least one flow channel therein, the flow channel having a first end and a second end respectively adjacent to a central region and a peripheral region of the substrate;
    a working fluid flowing in the flow channel in a gas-liquid coexistence state; and
    a fluorescent powder layer disposed on the substrate and located at the peripheral region.

2. The fluorescent color wheel of claim 1, wherein the substrate further has a plurality of the flow channels, and the flow channels are radially arranged around the central region.

3. The fluorescent color wheel of claim 2, wherein the substrate further has at least one passageway communicated between adjacent two of the flow channels.

4. The fluorescent color wheel of claim 3, wherein the passageway is located between the first end and the second end of any of the adjacent two of the flow channels.

5. The fluorescent color wheel of claim 1, wherein the substrate has a centroid located in the central region, and a virtual extension line of the flow channel does not intersect the centroid.

6. The fluorescent color wheel of claim 5, wherein the substrate is configured to rotate along a rotational direction based on the centroid, and the virtual extension line is offset relative to a radial extension line passing through the centroid and the first end based on the first end along an opposite direction of the rotational direction.

7. The fluorescent color wheel of claim 6, wherein the virtual extension line is offset relative to the radial extension line along the opposite direction with an angle, and the angle is greater than 0 degree and smaller than 90 degrees.

8. A projector, comprising:
    a housing;
    a motor disposed in the housing and having a shaft; and
    a fluorescent color wheel comprising:
        a substrate having at least one flow channel therein, the flow channel having a first end and a second end respectively adjacent to a central region and a peripheral region of the substrate, wherein the substrate has a hole located at the central region and engaged with the shaft;
        a working fluid flowing in the flow channel in a gas-liquid coexistence state; and
        a fluorescent powder layer disposed on the substrate and located at the peripheral region.

9. The projector of claim 8, wherein the shaft has a central axis, and a virtual extension line of the flow channel does not intersect the central axis.

10. The projector of claim 9, wherein the motor is configured to make the substrate rotate along a rotational direction through the shaft, and the virtual extension line is offset relative to a radial extension line passing through the central axis and the first end based on the first end along an opposite direction of the rotational direction.

* * * * *